(12) United States Patent
Mallipeddi

(10) Patent No.: US 12,242,538 B2
(45) Date of Patent: Mar. 4, 2025

(54) THEME BASED FONT SEARCH

(71) Applicant: Microsoft Technology Licensing, LLC, Redmond, WA (US)

(72) Inventor: Akshay Mallipeddi, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/188,667

(22) Filed: Mar. 23, 2023

(65) Prior Publication Data

US 2024/0320268 A1 Sep. 26, 2024

(51) Int. Cl.
| | | |
|---|---|---|
| *G06F 16/00* | (2019.01) | |
| *G06F 16/9032* | (2019.01) | |
| *G06F 16/9038* | (2019.01) | |
| *G06F 16/906* | (2019.01) | |
| *G06F 18/2413* | (2023.01) | |

(52) U.S. Cl.
CPC .... *G06F 16/90328* (2019.01); *G06F 16/9038* (2019.01); *G06F 16/906* (2019.01); *G06F 18/2413* (2023.01)

(58) Field of Classification Search
CPC .......... G06F 16/90328; G06F 16/9038; G06F 16/906; G06F 18/2413
See application file for complete search history.

(56) References Cited

U.S. PATENT DOCUMENTS 10,445,408 B2   10/2019   Sinn et al.
2020/0311186 A1*  10/2020  Wang ................. G06F 18/2148

OTHER PUBLICATIONS

Chen, Q., Li, F. L., Xu, G., Yan, M., Zhang, J., & Zhang, Y. (2022). DictBERT: dictionary description knowledge enhanced language model pre-training via contrastive learning. arXiv preprint arXiv:2208.00635 (Year: 2022).*

* cited by examiner

*Primary Examiner* — Paul Kim
(74) *Attorney, Agent, or Firm* — Cantor Colburn LLP; Thomas S Wong

(57) ABSTRACT

Aspects of the disclosure include methods and systems for providing a theme based font search in a manner that bypasses the latency limitations inherent to large language models and ensures domain-relevant answers. An exemplary method can include inputting a font category to a compact model to generate a font tag embedding and inputting a search query to the compact model to generate a query embedding. A distance measure is determined between the query embedding and the font tag embedding. The font category for the font tag embedding is provided as a suggested font category responsive to the distance measure satisfying a predetermined threshold.

16 Claims, 6 Drawing Sheets

THEME BASED FONT SEARCH

INTRODUCTION

The subject disclosure relates to machine learning and large language models, and particularly to leveraging a large language model for a theme-based font search.

A large language model is a neural network machine learning architecture that is capable of processing large amounts of text data and generating high-quality natural language responses. In practice, large language models have been used for a wide range of natural language processing (NLP) tasks, including, for example, machine translation, text generation, sentiment analysis, and question answering (i.e., query-and-response). Large language models have also been adapted for other domains, such as computer vision, speech recognition, and software development.

At its core, a large language model consists of an encoder and a decoder. The encoder takes in a sequence of input tokens, such as words or characters, and produces a sequence of hidden representations for each token that capture the contextual information of the input sequence. The decoder then uses these hidden representations, along with a sequence of target tokens, to generate a sequence of output tokens.

The most popular and widely used types of large language models are recurrent neural networks (RNNs) and transformers. RNNs are neural networks that process sequences of inputs one by one, and use a hidden state to remember previous inputs. RNNs are particularly well-suited for tasks that involve sequential data, such as text, audio, and time-series data. In a transformer, on the other hand, the encoder and decoder are composed of multiple layers of multi-headed self-attention and feedforward neural networks. The core of the transformer model is the self-attention mechanism, which allows the model to focus on different parts of an input sequence at different timesteps, without the need for recurrent connections that process the sequence one by one. Transformers leverage self-attention to compute representations of input sequences in a parallel and context-aware manner and are well-suited to tasks that require capturing long-range dependencies between words in a sentence, such as in language modeling and machine translation.

Large language models are typically trained on large amounts of text data, often containing hundreds of millions if not billions of words. To handle the large amount of data, the training process is often highly parallelized. The training process can take several days or even weeks, depending on the size of the model and the amount of training data involved. Large language models can be trained using backpropagation and gradient descent, with the objective of minimizing a loss function such as cross-entropy loss.

SUMMARY

Embodiments of the present invention are directed to methods for providing a theme based font search. A non-limiting example method includes inputting a font category to a compact model to generate a font tag embedding and inputting a search query to the compact model to generate a query embedding. A distance measure is determined between the query embedding and the font tag embedding. The font category for the font tag embedding is provided as a suggested font category responsive to the distance measure satisfying a predetermined threshold.

Embodiments of the present invention are directed to systems for providing a theme based font search. A non-limiting example system includes a memory having computer readable instructions and one or more processors for executing the computer readable instructions. The computer readable instructions control the one or more processors to perform various operations. The operations include presenting a user interface to a user during a session. The user interface can include a search box and a font category suggestion frame. The operations can further include receiving a search query input in the search box, passing the search query to a second system, receiving, from the second system, a top N font categories for the search query, and populating the font category suggestion frame with the top N font categories for the search query.

Another non-limiting example system includes a compact model, a data warehouse storing the compact model and one or more font tag embeddings, a memory having computer readable instructions, and one or more processors for executing the computer readable instructions. The computer readable instructions control the one or more processors to perform operations. The operations include inputting a font category to the compact model to generate a font tag embedding, storing the font tag embedding in the data warehouse, receiving a search query from a second system, inputting the search query to the compact model to generate a query embedding, determining a distance measure between the query embedding and the font tag embedding, and responsive to the distance measure satisfying a predetermined threshold, providing the font category for the font tag embedding to the second system.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
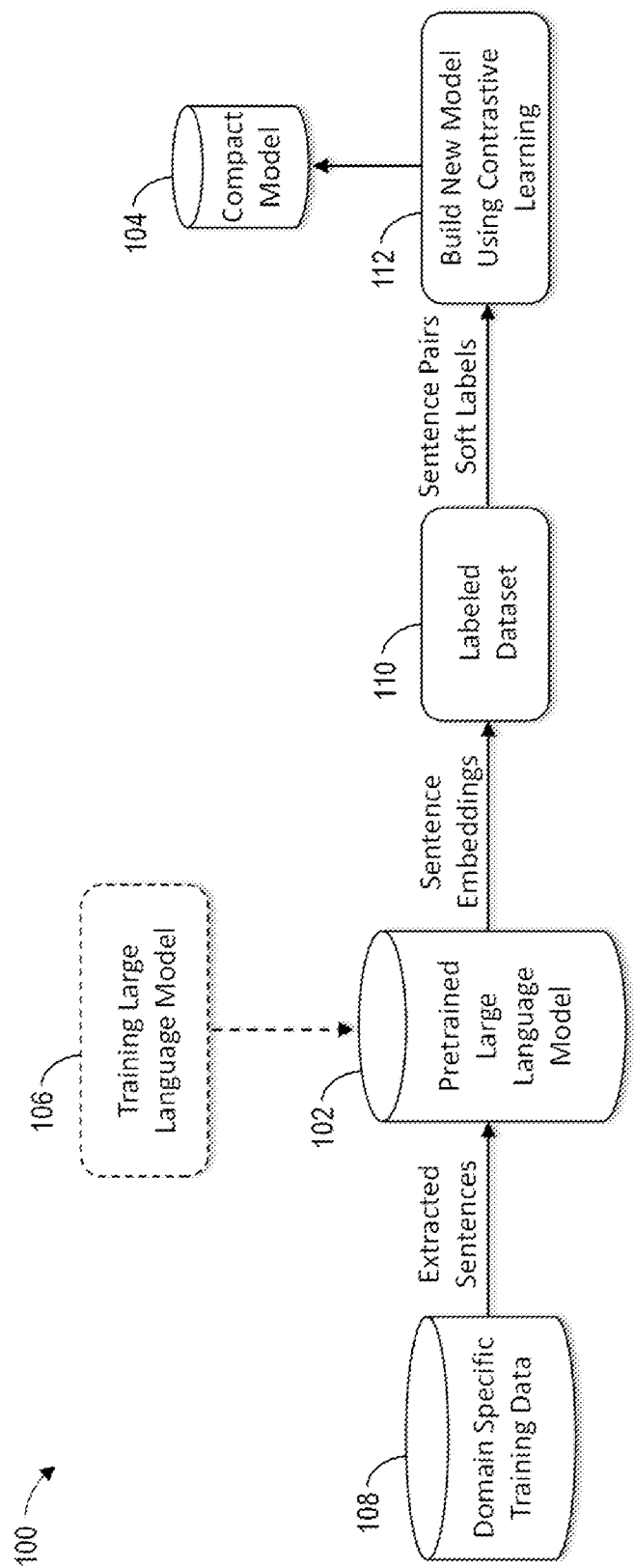
FIG. 1 depicts a block diagram of a workflow for leveraging a large language model to build a compact model for a theme based font search in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

Designing a document (or other written and/or visual project) involves making intentional decisions about the visual elements of the document to ensure that it is visually appealing, easy to read, and effectively communicates its message. One important aspect of document design is font selection. Fonts, or typefaces, are sets of characters with a consistent design that can be used to display text. Font selection is important for a wide range of products, particularly those involving written communication and/or visual design, such as, for example, in printed materials (e.g., books, magazines, brochures, flyers, posters, etc.), websites (e.g., web design), product packaging, logos, presentations, and advertisements.

The right font can make these materials more visually appealing and easier to read. For example, a font can help to create a consistent visual style, making it easier for users to read and navigate a website. A font can help to communicate the brand identity and intended message of a product. Similarly, fonts can help to communicate the personality and tone of a brand. In short, by selecting the right fonts, designers can enhance the overall effectiveness and appeal of a product as well as the readability of a document.

When choosing a font, it is important to consider the purpose and tone of the product, as well as the intended audience. For example, a formal document may require a more traditional font, while a more creative or casual document could benefit from a more playful or unique font. Unfortunately, users currently follow a somewhat tedious approach for font selection, typically searching through an exhaustive list of available fonts and trying those fonts, one by one, until ultimately selecting a font(s) for the document, design, project, etc.

This disclosure involves the use of large language models and compact models for font selection. As described previously, large language models have been adapted across a number of domains, including question answering, also referred to as query-and-response. Large language models are trained over relatively huge datasets (millions of words) and can include a large number of internal features (e.g., 12 hidden layers, 24 hidden layers, etc.). While extremely powerful, these large language models suffer from native latency constraints and are typically domain-agnostic.

Aspects of the present disclosure introduce a way to leverage a pre-trained large language model to build a compact model to provide a theme based font search, bypassing the latency limitations inherent to the large language model and ensuring domain-relevant answers. In some embodiments, a pre-trained large language model is fed domain-specific data including scenario-specific sentences. In some embodiments, the scenario-specific sentences are extracted from domain-specific product templates, such as, for example, existing product designs, documents/documentation, product brochures, flyers, webpages, packaging, logos, presentations, advertisements, etc. (collectively, "documents" and/or "content items"). In some embodiments, the large language model outputs an embedding for each sentence. Pairs of sentence embeddings are selected and scored (soft labeled).

In some embodiments, the soft labels are used to build a compact model using contrastive learning. Notably, the compact model is of lower architectural complexity than the large language model. In essence, contrastive learning involves training the compact model to match the soft labels of the sentence pair embeddings derived using the large language model. In this manner, a compact model can be built to efficiently provide domain-relevant answers (e.g., font category recommendations) without the overhead (latency limitations, model complexity, etc.) of the large language model.

Advantageously, compact models built for a theme based font search can provide users with a seamless, natural language based font selection process without the latency limitations inherent to large language models. Moreover, providing a theme based font search as described herein enables users to efficiently search for any kind of font, even those they do not know to look for, based on the font name, font style, and/or merely an intent/theme of the font/product of interest.

Compact models trained for theme based font search in accordance with one or more embodiments offer several technical advantages over other font selection processes. As described previously, the compact models can provide relevant font suggestions to a user at latencies that are not achievable using large language models. Notably, compact models trained using contrastive learning in accordance with one or more embodiments need not be trained to understand how a particular font visually "looks", such as the font's text height, style, etc.-instead the compact model can be trained directly on the soft labels and embeddings derived from the large language model-further improving latencies by greatly reducing model complexity. In addition, systems designed according to one or more embodiments offer notable improvements in user interaction, including miniaturization (e.g., less required space for full font selection GUI functionality), improved usability (moving beyond simple lists of available fonts), and improved user efficiency (e.g., system can populate font options in response to a user query even for fonts that are unknown to the user-reducing the time it takes a user to find and select a font in a straightforward way using natural language prompts).

FIG. 1 depicts a block diagram of a workflow 100 for leveraging a large language model 102 to build a compact model 104 for a theme based font search in accordance with one or more embodiments of the present invention. In some embodiments, the large language model 102 is a pretrained large language model. In some embodiments, the large language model 102 is pretrained to output an embedding for an input sentence. In some embodiments, the large language model 102 is pretrained prior to the workflow 100. In some embodiments, the workflow 100 optionally includes pretraining 106 the large language model.

Overall, training a large language model involves significant computing resources and can take several days, weeks, or even longer to complete, depending on the size of the dataset(s) and the complexity of the model. Processes for training large language models are known and are not meant to be particularly limited. For example, training a transformer-based generative language model typically involves data preparation, model initialization, training, and model evaluation.

Data preparation involves sourcing and preprocessing a large corpus of text for training. In many cases, the corpus is preprocessed by tokenizing the text into individual words or subwords and mapping them to numerical embeddings, although other preprocessing techniques are possible. The model parameters can be initialized randomly or using pre-trained weights taken, for example, from a similar and/or prior model. The model can be trained using one or more of a variety of techniques, such as, for example, by a stochastic gradient descent (SGD) approach in combination with the use of an objective function. The objective function can include, for example, a so-called maximum likelihood estimation (MLE), which involves maximizing the probability of generating a next word in a sequence given the previous words, although other objective functions are possible. A trained model can be validated using a validation data set to monitor the model's performance and to prevent overfitting. Model validation can include some combination of a variety of metrics, such as perplexity and accuracy, to measure the quality of the generated text.

In some embodiments, domain-specific training data 108 is input to the pretrained large language model 102 to generate domain-specific embeddings. In some embodiments, the domain-specific training data 108 includes a library of existing product designs (e.g., documents, product brochures, flyers, webpages, packaging, logos, presentations, adverts, etc.), also referred to herein as templates. In some embodiments, the library (or template library) includes a large number of such product designs (e.g., thousands, tens of thousands, hundreds of thousands, or even larger data sets). For example, a template library might contain 40,000 to 50,000 product designs. The size of the domain-specific training data 108 is not meant to be particularly limited and template libraries having any number of product designs are within the contemplated scope of this disclosure.

In some embodiments, the product designs are sourced from subject matter experts. In some embodiments, the product designs are scrapped from publicly and/or privately available data sources, such as, for example, the Internet. In some embodiments, the product designs are sourced from a combination of subject matter expert creations as well as public and private data sources.

In some embodiments, each design includes some combination of written and visual data. Written data can include, for example, a title, a subtitle, and text. Visual data can include, for example, graphics and colors. In some embodiments, the domain-specific training data 108 is built by scrapping the templates for the written data, resulting in large "sentences" that include, for example, the title, subtitle, and text of a respective template. In some embodiments, these sentences (e.g., thousands, tens of thousands, or more) are fed to the pretrained large language model 102 to generate the domain-specific embeddings (e.g., thousands, tens of thousands, or more).

In some embodiments, the workflow 100 includes generating a labeled dataset 110. In some embodiments, the labeled dataset 110 includes scored sentence pairs. In some embodiments, sentence pairs (e.g., $S_1$, $S_2$) are selected from the domain-specific embeddings of the sentences and scored (e.g., soft labeled). In some embodiments, the sentence pairs are selected randomly. In some embodiments, the sentence pairs are selected manually, for example, by a subject matter expert labeler(s). In some embodiments, all possible sentence pairs are selected. In some embodiments, only a subset of all possible sentence pairs are selected.

In some embodiments, each selected sentence pair is scored (or labeled) as one of a positive sentence pair (e.g., "1") or a negative sentence pair (e.g., "0"). For example, a first sentence $S_1$ and a second sentence $S_2$ can be scored 0 or 1. In other words, soft labels having a value of 0 or 1 can be generated for each of the selected pairs of sentences.

In some embodiments, a positive score denotes a passing similarity threshold between the sentences in the sentence pair, whereas a negative score denotes a failing similarity threshold between the sentences (i.e., that the sentences are dissimilar). As used herein, "similarity" means that the two sentences share a same contextual theme. For example, a first sentence encoding a birthday card and a second sentence encoding a birthday party invitation share a same contextual theme—birthdays—and will be scored positively. Conversely, a first sentence encoding a birthday card and a second sentence encoding a construction notice do not share a same contextual theme and will be scored negatively. Observe that, in many contexts, whether two sentences are similar (and to what degree) includes a measure of subjectivity. In some embodiments, a sentence pair is scored manually, for example, by a subject matter expert labeler(s) using domain-specific knowledge, personal knowledge, and/or general knowledge.

In some embodiments, a 3-tuple <$S_1$, $S_2$, SCORE> is generated for each selected sentence pair, where "SCORE" denotes the soft label value. In some embodiments, the generated 3-tuples for each selected sentence pair define the labeled dataset 110.

In some embodiments, the labeled dataset 110 is used, at block 112, to build (sometimes referred to as fine-tune) the compact model 104. As described previously, the compact model 104 is of lower architectural (model) complexity than the pretrained large language model 102. For example, while the pretrained large language model 102 might be a large transformer-based generative model having 78 transformer layers, a hidden size of 4256, and 28 attention heads, the compact model 104 might be a neural network having only 2 hidden layers. It should be understood that the provided examples for the pretrained large language model 102 and the compact model 104 are provided only for ease of discussion and to illustrate the difference in complexity between the respective models. The exact configuration (e.g., transformer, RNN, etc.) and complexity (e.g., number of layers) of the pretrained large language model 102 and the compact model 104 are not meant to be particularly limited, and all such configurations of a first, relatively complex model and a second, relatively less complex model are within the contemplated scope of this disclosure.

In some embodiments, the compact model 104 is built using less than 25 percent the number of layers of the pretrained large language model 102 (e.g., for a large transformer-based generative model having 78 transformer layers the compact model 104 will include 19 or fewer hidden layers). In some embodiments, the compact model 104 is built using less than 10 percent the number of layers of the pretrained large language model 102 (e.g., for a large transformer-based generative model having 78 transformer layers the compact model 104 will include 7 or fewer hidden layers). In some embodiments, the compact model 104 is built using less than 5 percent the number of layers of the pretrained large language model 102 (e.g., for a large transformer-based generative model having 78 transformer layers the compact model 104 will include 3 or fewer hidden layers). In some embodiments, the compact model 104 is built using less than 3 percent the number of layers of the pretrained large language model 102 (e.g., for a large transformer-based generative model having 78 transformer layers the compact model 104 will include 1 or 2 hidden layers).

In some embodiments, the generated 3-tuples (sentence pairs and respective scores) are used to build the compact model 104 using a contrastive learning approach. In essence, contrastive learning involves training the compact model 104 to match the soft labels (scores) of the sentence pair embeddings derived using the pretrained large language model 102. The contrastive learning approach will be illustrated by way of an example compact model 104: a two layer Turing Natural Language Representation (T-NLR) model, as shown in FIG. 2.

Figure 2:
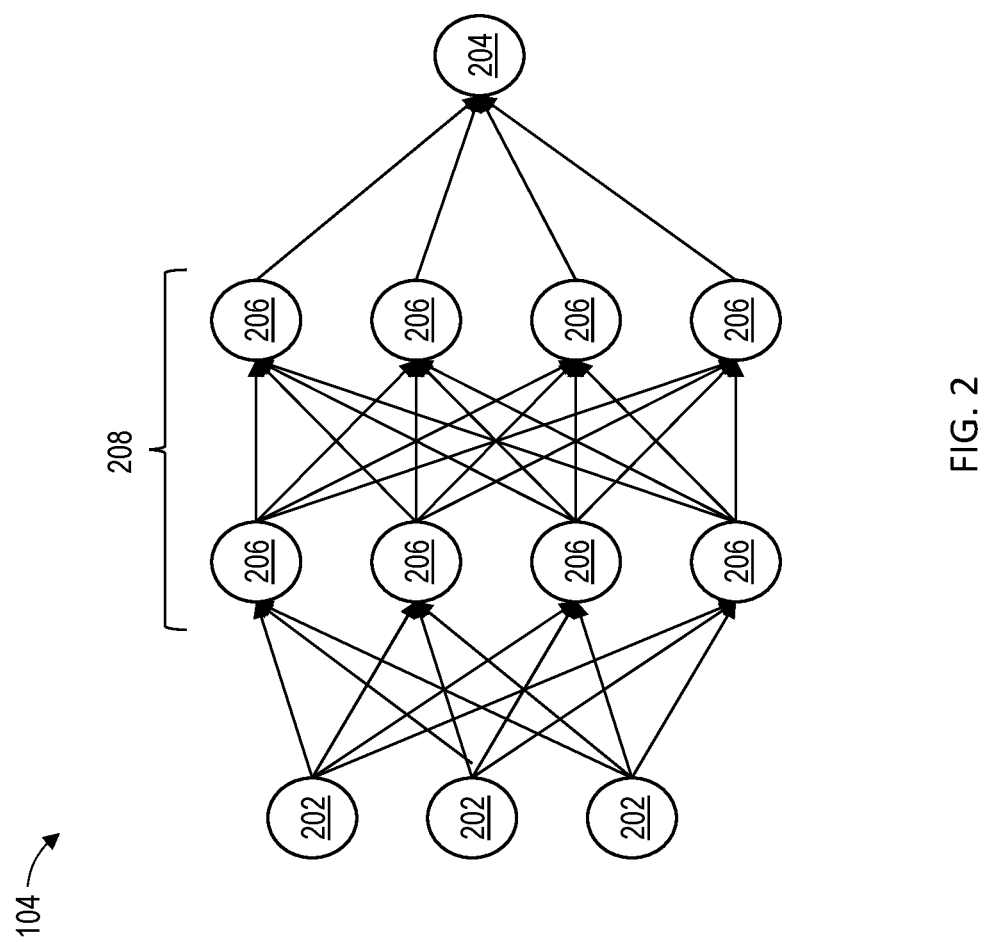
FIG. 2 depicts an example compact model in accordance with one or more embodiments.

As shown in FIG. 2, the compact model 104 includes one or more input nodes 202, an output node 204, and a plurality of hidden nodes 206 distributed amongst one or more hidden layers 208. In some embodiments, the compact model 104 includes three input nodes 202, one output node 204, and two hidden layers 208, each hidden layer 208 having four hidden nodes 206 (as shown). In some embodiments, the compact model 104 includes three input nodes 202 encoding, respectively, a first sentence $S_1$, a second sentence $S_2$, and a score SN, corresponding, for example, to an input 3-tuple configured as described herein. Again, other configurations are possible, and all such configurations are within the contemplated scope of this disclosure.

In some embodiments, the compact model 104 is initialized by setting, manually or randomly, the weights of the various hidden nodes 206 of the hidden layers 208 to some initial value(s). In some embodiments, the weights of the various hidden nodes 206 are initialized using pre-trained weights taken, for example, from a similar and/or prior model. In some embodiments, the weights of the various hidden nodes 206 are initialized to the same value, or alternatively, to different values.

In some embodiments, the compact model 104 is trained (i.e., the weights of the hidden nodes 206 are determined) by successively inputting a plurality of 3-tuples into the input nodes 202 and, for each 3-tuple, adjusting one or more weights of the hidden nodes 206 until a value of the output node 204 matches the known score of the respective 3-tuple. In short, the known scores for each 3-tuple serve as a ground truth against which the internal weights of the compact model 104 can be trained.

To illustrate, consider a scenario where, prior to training completion, the compact model 104, responsive to an input first sentence $S_1$ and a second sentence $S_2$, indicates that the sentences are not similar, when it is known (via the respective score SN) that the sentences are in fact similar. Continuing with this scenario, one or more (possibly all) weights of the hidden nodes 206 can be adjusted until the output node 204 agrees with the ground truth (i.e., that the sentences are similar). For example, the weights of the hidden nodes 206 can be adjusted until the output node 204 has a value of "1", or a value within a predetermined threshold of "1" (i.e., a value sufficient to indicate that the sentences are similar).

The compact model 104 can be trained in this manner using one or more of a variety of techniques, such as, for example, by a stochastic gradient descent (SGD) approach in combination with the use of an objective function over a set of 3-tuples to achieve a desired level of accuracy. That is, the compact model 104 can be trained on an arbitrarily large set of training data (3-tuples) until agreement with the known ground truth of an input 3-tuple reaches a predetermined degree of accuracy. The particular degree of accuracy enforced during training is not meant to be particularly limited, but may include, for example, a prediction accuracy of at least 50 percent, at least 75 percent, at least 90 percent, at least 95 percent, at least 98 percent, at least 99 percent, etc.

In some embodiments, the compact model 104, once fine-tuned on the soft labels (i.e., trained on sentence pairs and known scores using contrastive learning as described previously), is leveraged to provide domain-relevant answers (e.g., font category recommendations) without the overhead (latency limitations, model complexity, etc.) of the pretrained large language model 102. In other words, the compact model 104 can be leveraged to provide a theme based font search.

Figure 3:
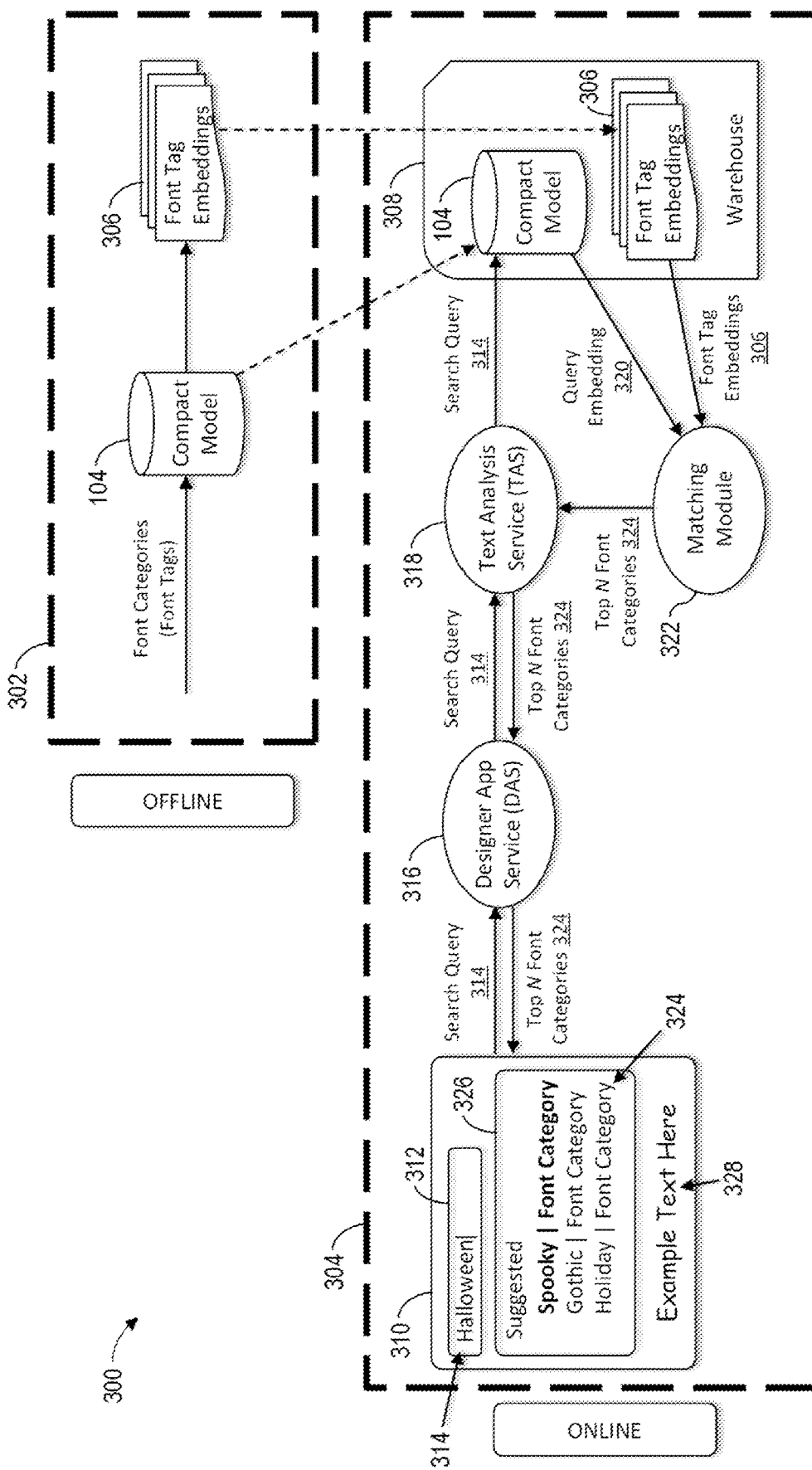
FIG. 3 depicts a block diagram of a workflow for leveraging the compact model for a theme based font search in accordance with one or more embodiments.

FIG. 3 depicts a block diagram of a workflow 300 for leveraging the compact model 104 for a theme based font search in accordance with one or more embodiments of the present invention. In some embodiments, workflow 300 includes an offline component 302 and an online component 304. As used in this context, the term "offline" does not necessarily mean off-network (e.g., disconnected from the Internet) but rather that this portion of the workflow 300 occurs separately (and prior) to any user interactions. Conversely, as used in this context, the term "online" does not necessarily mean on-network (e.g., connected to the Internet) but rather that this portion of the workflow 300 occurs actively (and responsively) to one or more user interactions (e.g., the inputting of a search query as described in greater detail below).

In some embodiments, the offline component 302 includes inputting one or more font categories, sometimes referred to as font tags, to the compact model 104. In some embodiments, each font tag is a single word token. For example, a font tag can include "holiday", "anniversary", "business", "education", "cartoon", "comic", "fun", "wedding", "spooky", "sports", "school", "friendly", "sprightly", "serious", etc. The particular font tags employed are not meant to be particularly limited and are provided only to illustrate the variety of possible font tags. In short, a font tag is meant to be a simple token (often only one or two words) describing an aspect(s) of a font.

In some embodiment, one of more font tags are created for each of a plurality of available fonts. In some embodiments, each font is "tagged" with one or more font tags manually by a human labeler. In some embodiments, each font is tagged with one or more font tags by a subject matter expert.

To illustrate, consider the font "Comic SANS MS". Comic SANS MS has a distinctive, informal appearance that is intended to resemble handwriting. The letters are rounded and have uneven edges, which gives the typeface a playful, casual feel. Comic SANS MS is often used to convey a lighthearted and/or humorous tone and is widely used in informal settings where a less formal and more approachable, fun tone is desired. For example, Comic SANS MS is the most popular font for Halloween invitations. A labeler might tag Comic SANS MS with the following font tags: "Greeting card", "Invitation", "Children's Materials", "Spooky", and "Halloween". Other tags are certainly possible.

In some embodiments, the compact model 104 generates an output, referred to herein as a font tag embedding, for each input font tag. For example, inputting the font tag "Halloween" into the compact model 104 will result in an output—this output can be stored as the font tag embedding of the font tag "Halloween". In this manner, a data set of font tag embeddings 306 can be generated for any number of desired font tags. Observe that a particular font tag embedding for a respective font tag need only be generated once during the offline component 302 of the workflow 300.

In some embodiments, the compact model 104 and the font tag embeddings 306 are stored in a data warehouse 308. In some embodiments, each of the font tag embeddings 306 are stored as a 2-tuple (or other mapping data structure) with their respective input token (font tag). For example, the font tag embedding for "Beach" can be stored alongside the token "Beach" itself in the data warehouse 308. The scale and configuration of the data warehouse 308 is not meant to be particularly limited. In some embodiments, the data warehouse 308 is accessed during the online component 304 of the workflow 300.

In some embodiments, the online component 304 includes a user interface 310 having a search box 312 (also referred to as a search bar). In some embodiments, the user interface 310 is presented to a user during a session (i.e., a user interaction with the user interface 310). In some embodiments, the search box 312 is configured such that a user can input (e.g., by typing, dictation, or otherwise) a font recommendation query (referred to herein as search query 314) into the search box 312. In some embodiments, the search query 314 includes a text string. For example, the search query 314 might include the text string, "Halloween" (as shown). The search query 314 need not be a single word string. For example, the search query 314 might include the text string, "A scary invitation with bats and ghosts" (not separately shown).

In some embodiments, the search query 314 is passed to a Designer Application Service (DAS) 316. In some embodiments, the DAS 316 is configured to parse and/or otherwise analyze the search query 314 to determine a type of data structure contained in the search query 314. In some embodiments, the DAS 316 determines that the search query 314 contains text data. In some embodiments, the DAS 316 is configured to pass the search query 314 to a Text Analysis Service (TAS) 318 responsive to the search query 314 containing text data.

In some embodiments, the TAS 318 is configured to parse and/or otherwise analyze the search query 314 to determine that the search query 314 includes a font recommendation query. In some embodiments, the TAS 318 is configured to pass the search query 314 to the compact model 104 responsive to the search query 314 containing a font recommendation query. In some embodiments, the TAS 318 is configured to pass the search query 314 to the data warehouse 308 responsive to the search query 314 containing a font recommendation query and one or more internal components (not separately shown) of the data warehouse 308 are configured to route the search query 314 to the compact model 104.

In some embodiments, the compact model 104 generates, as output, a query embedding 320 responsive to receiving, as input, the search query 314. The query embedding 320 can be generated in substantially the same manner as the font tag embeddings 306 described previously herein.

In some embodiments, the query embedding 320 and the font tag embeddings 306 are passed to a matching module 322. The matching module 322 can be stored within, or separately from, the data warehouse 308. In some embodiments, the matching module 322 is configured to complete a one-to-many similarity mapping between the query embedding 320 and the font tag embeddings 306. That is, the matching module 322 is configured to determine a similarity score between the query embedding 320 and each of the font tag embeddings 306.

In some embodiments, the similarity score between the query embedding 320 and each respective embedding of the font tag embeddings 320 is quantified using a distance measure. A distance measure (also referred to as a distance metric) measures the degree of separation between two entities in a given space. In most constructions, a smaller distance means that the values are relatively similar to each other, while a larger distance implies they are relatively dissimilar.

The specific distance measure used to determine the similarity scores between the query embedding 320 and the font tag embeddings 320 is not meant to be particularly limited. A number of distance measures are known and all such distance measures are within the contemplated scope of this disclosure. For example, one type of distance measure used to quantify similarity between two values is the Cosine distance (or cosine similarity). The Cosine distance metric calculates the cosine of the angle between two vectors, which is a measure of their similarity. The Cosine distance ranges from 0 to 1, with 0 indicating that the vectors are completely dissimilar, while 1 means they are identical. Other distance measures include, for example, Euclidean distance, Manhattan distance, Minkowski distance, and Hamming distance.

In some embodiments, the matching module 322 is configured to select the top N most similar embeddings of the font tag embeddings 320 to the query embedding 320. The value of N is not meant to be particularly limited and can be, for example, a predetermined percentage and/or number of the font tag embeddings 320. For example, the top "3" most similar embeddings can be selected. In some embodiments, the value N is allowed to float to allow for any number of embeddings to be selected, subject to a predetermined threshold similarity score. For example, N can be allowed to dynamically float such that all embeddings having a similarity score of greater than or equal to 0.8, 0.9, 0.95, 0.97, 0.99, etc., are selected as the top N most similar embeddings. For example, the top "5" most similar embeddings can be selected in a scenario where 5 of the embeddings have a similarity score above 0.9.

In some embodiments, the matching module 322 is configured to fetch and/or otherwise determine the respective font category (font tag) for each of the top N most similar embeddings. As described previously, each of the font tag embeddings 306 can be stored as a 2-tuple with their respective input token (font tag). In some embodiments, the matching module 322 determines the N respective font tags by reading the font tag portion of the 2-tuples. In some embodiments, the matching module 322 passes each of the top N most similar embeddings back to the data warehouse 308 and the data warehouse 308 is configured to return the N respective font tags.

In some embodiments, the matching module 322 is configured to pass the top N font categories 324 (i.e., the N respective font tags) to the TAS 318. In some embodiments, the TAS 318 is configured to pass the top N font categories 324 to the DAS 316. In some embodiments, the DAS 316 is configured to pass the top N font categories 324 to the user interface 310.

In some embodiments, the user interface 310 includes a font category suggestion frame 326 configured to populate (display) the top N font categories 324. For example, the font category suggestion frame 326 might include the "Suggested" font categories "Spooky", "Gothic", and "Holiday" responsive to a search query 314 for "Halloween" (as shown). In some embodiments, one or more of the top N font categories 324 are visually emphasized relative to the other ones of the top N font categories 324. For example, the suggestion for "Spooky" might be put in bold typeface (as shown). In other embodiments, one or more suggestions can be highlighted, underlined, italicized, and/or made of a larger font, etc., to distinguish the emphasized suggestion from the remaining suggestions. In some embodiments, the one or more visually emphasized suggestion(s) are the font tags of the most similar embeddings determined via the matching module 322.

In some embodiments, the user interface 310 is configured to display an example text 328 depicting a font of one or more of the top N font categories 324. In some embodiments, the user interface 310 is configured to display an example text 328 responsive to a selection by the user of one top N font categories 324 in the font category suggestion frame 326. In some embodiments, the user interface 310 is configured to display an example text 328 responsive to an indication of interest from the user, such as, for example, on mouseover, of one the top N font categories 324 in the font category suggestion frame 326.

Figure 4:
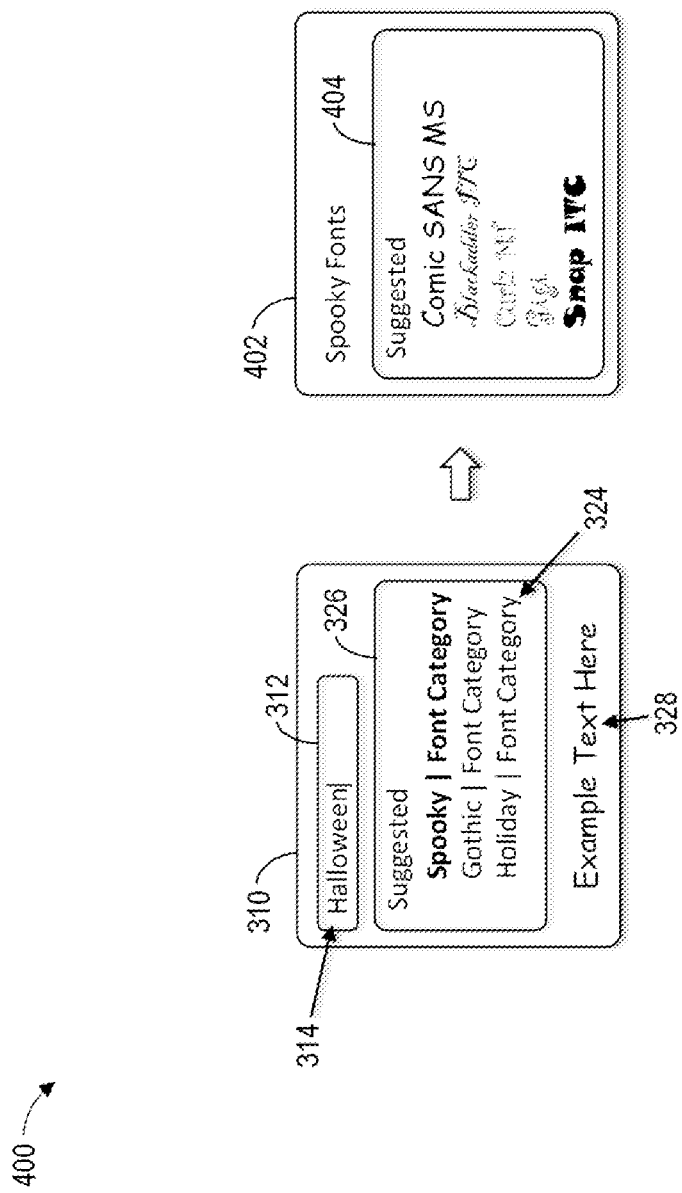
FIG. 4 depicts a block diagram of a workflow for suggesting one or more fonts in accordance with one or more embodiments.

FIG. 4 depicts a block diagram of a workflow 400 for suggesting one or more fonts in accordance with one or more embodiments of the present invention. As described previously herein, the user interface 310 can include a font category suggestion frame 326 for displaying the top N font categories 324. In some embodiments, the font category suggestion frame 326 and/or the user interface 310 is configured to receive a user selection of a font category of the top N font categories 324. For example, the user interface 310 can be configured to allow a user to select, via clicking or otherwise, a font category of the top N font categories 324.

In some embodiments, the user interface 310 is configured to display a font suggestion frame 402. In some embodiments, the user interface 310 is configured to display the font suggestion frame 402 responsive to a selection (via clicking or otherwise) of a font category of the top N font categories 324 in the font category suggestion frame 326.

In some embodiments, the font suggestion frame 402 includes one or more suggested fonts identified via respective font labels 404. For example, upon selection of the "Spooky" font category in the font category suggestion frame 326, the font suggestion frame 402 might suggest the font labels: "Comic SANS MS", "Blackadder ITC", "Curlz MT", "Gigi", and "Snap ITC" (as shown). As described previously, in some embodiments, each font is "tagged" with one or more of the font tags manually by a human labeler. In some embodiments, the font suggestion frame 402 is configured to suggest, via the font labels 404, one or more of the fonts having a font tag matching the selected font category.

In some embodiments, each of the font labels 404 is displayed in a stylized manner corresponding to their respective font typeface. For example, the font label "Comic SANS MS" can be displayed using the comic SANS MS font, while the font label "Blackadder ITC" can be displayed using the Blackadder ITC font. In this manner, a user can quickly evaluate the one or more suggested font labels 404.

Figure 5:
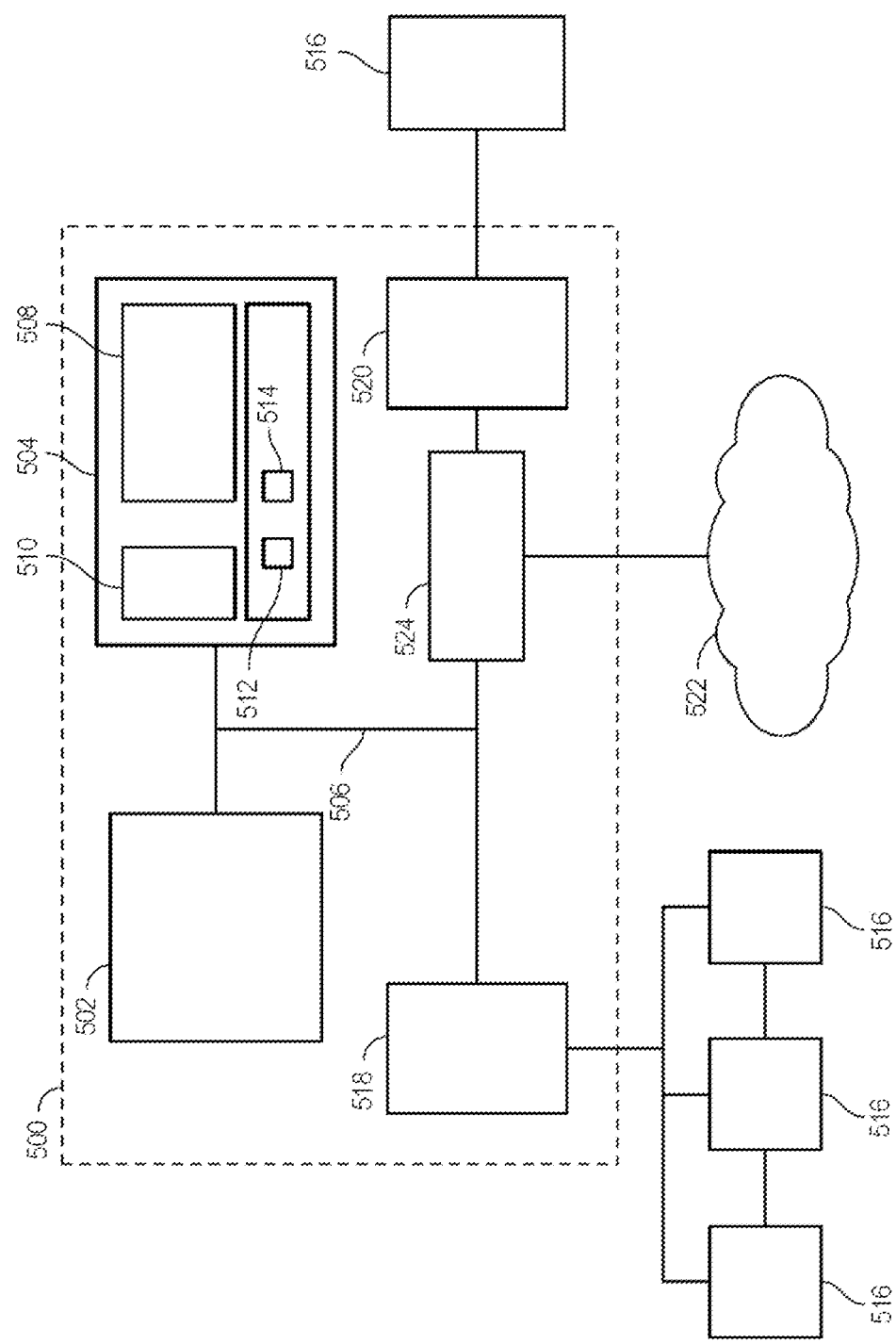
FIG. 5 depicts a block diagram of a computer system according to one or more embodiments.

FIG. 5 illustrates aspects of an embodiment of a computer system 500 that can perform various aspects of embodiments described herein. In some embodiments, the computer system(s) 500 can implement and/or otherwise be incorporated within or in combination with any of the workflows 100, 300, 400 described previously herein. In some embodiments, a computer system 500 can be implemented client-side. For example, a computer system 500 can be configured to display and carry out the functionality of the user interface 310. In some embodiments, a computer system 500 can be implemented server-side. For example, a computer system 500 can be configured to build the compact model 104 using a contrastive learning approach. In another server-side example, a computer system 500 can be configured to receive a search query 314 from a user (remote) system and to, responsive to receiving the search query 314, provide the top N font categories 324 (including, e.g., some or all aspects of the DAS 316, the TAS 318, the matching module 322, and/or the data warehouse 308).

The computer system 500 includes at least one processing device 502, which generally includes one or more processors or processing units for performing a variety of functions, such as, for example, completing any portion of the workflows 100, 300, 400 described previously herein. Components of the computer system 500 also include a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media. For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to the workflow 100, 300, 400 as described previously herein. The computer system 500 is not so limited, as other modules may be included depending on the desired functionality of the computer system 500. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 502 can also be configured to communicate with one or more external devices 516 such as, for example, a keyboard, a pointing device, and/or any devices (e.g., a network card, a modem, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc.

Figure 6:
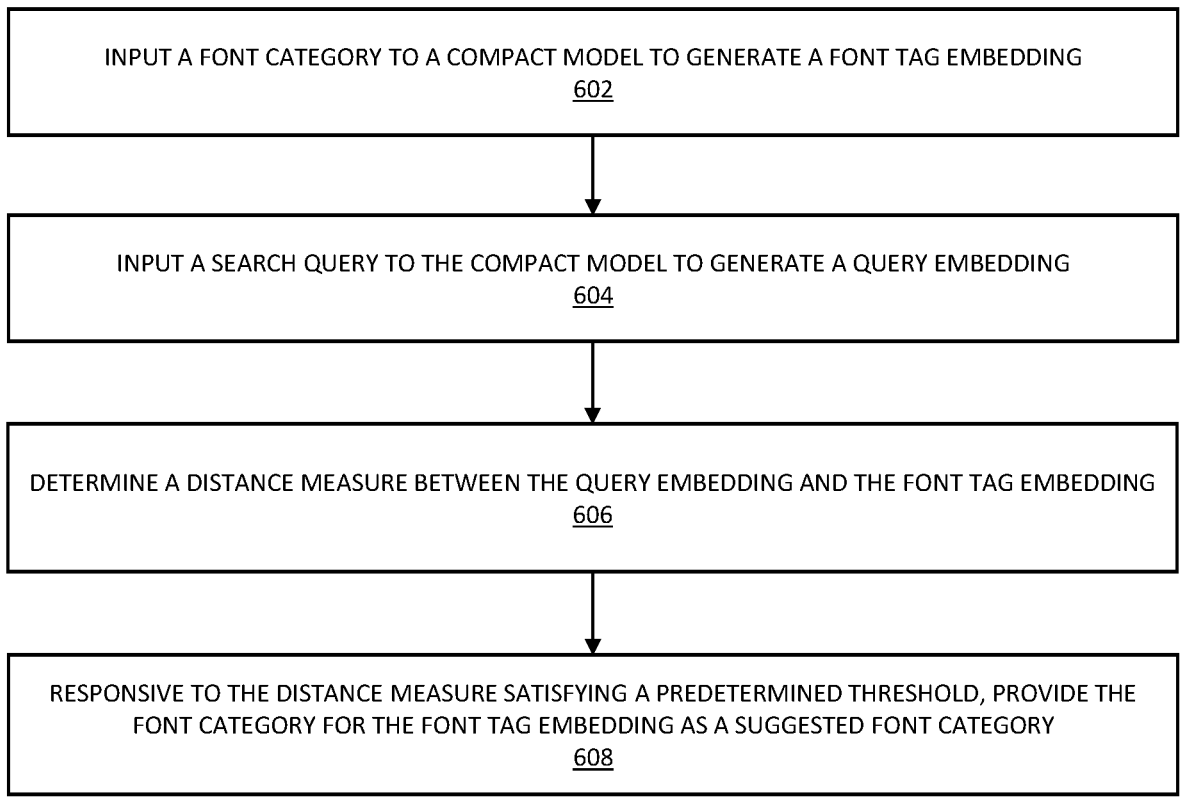
FIG. 6 depicts a flowchart of a method for theme based font searching in accordance with one or more embodiments.

Referring now to FIG. 6, a flowchart 600 for a theme based font search method is generally shown according to an embodiment. The flowchart 600 is described with reference to FIGS. 1 to 5 and may include additional steps not depicted in FIG. 6. Although depicted in a particular order, the blocks depicted in FIG. 6 can be, in some embodiments, rearranged, subdivided, and/or combined.

At block 602, a font category is input to a compact model to generate a font tag embedding. The font category can include, for example, the token "family".

At block 604, a search query is input to the compact model to generate a query embedding. The search query can include, for example, the text string "a wedding invitation".

At block 606, a distance measure between the query embedding and the font tag embedding is determined. In some embodiments, the distance measure is defined according to a cosine distance between the respective embeddings.

At block 608, the font category for the font tag embedding is provided as a suggested font category responsive to the distance measure satisfying a predetermined threshold. In some embodiments, the top N font categories (font tags) are provided as suggested font categories.

In some embodiments, the method includes receiving the search query in a user interface and, responsive to receiving the search query, displaying the suggested font category in the user interface.

In some embodiments, the method includes receiving a selection of the suggested font category within the user interface. In some embodiments, the method includes, responsive to receiving the selection of the suggested font category, providing one or more font recommendations for fonts labeled with the respective suggested font category.

In some embodiments, the method includes training the compact model from a large language model using contrastive learning. In some embodiments, the compact model includes a first model complexity having a first number of hidden layers and the large language model includes a second model complexity having a second number of layers larger than the first number of hidden layers.

In some embodiments, domain-specific training data including sentences extracted from design templates are input to the large language model to generate, for each extracted sentence, a domain-specific sentence embedding. In some embodiments, one or more pairs of sentence embeddings are labeled with a soft label. In some embodiments, each pair of sentence embeddings is labeled as one of a positive sentence pair and a negative sentence pair. In some embodiments, a positive soft label denotes a passing similarity threshold between the sentences in the respective pair of sentence embeddings and a negative soft label denotes a failing similarity threshold between the sentences in the respective pair of sentence embeddings.

In some embodiments, the compact model is trained to output scores that agree with the soft labels of the pairs of sentence embeddings derived using the large language model.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
   training a compact model from a large language model using contrastive learning, wherein the contrastive learning comprises inputting domain-specific training data comprising sentences extracted from design templates to the large language model to generate, for each extracted sentence, a domain-specific sentence embedding;
   inputting a font category to the compact model to generate a font tag embedding;
   inputting a search query to the compact model to generate a query embedding;
   determining a distance measure between the query embedding and the font tag embedding; and
   responsive to the distance measure satisfying a predetermined threshold, providing the font category for the font tag embedding as a suggested font category.

2. The method of claim 1, further comprising:
   receiving the search query from a user via a user interface; and
   responsive to receiving the search query, displaying the suggested font category in the user interface.

3. The method of claim 2, further comprising, responsive to receiving a selection of the suggested font category, providing one or more font recommendations for fonts labeled with the respective suggested font category.

4. The method of claim 1, wherein the compact model comprises a first model complexity comprising a first number of hidden layers and the large language model comprises a second model complexity comprising a second number of layers larger than the first number of hidden layers.

5. The method of claim 1, further comprising labeling one or more pairs of sentence embeddings with a soft label, wherein each pair of sentence embeddings is labeled as one of a positive sentence pair and a negative sentence pair, wherein a positive soft label denotes a passing similarity threshold between the sentences in the respective pair of sentence embeddings and a negative soft label denotes a failing similarity threshold between the sentences in the respective pair of sentence embeddings.

6. The method of claim 5, wherein training the compact model from a large language model using contrastive learning comprises training the compact model to output scores that agree with the soft labels of the pairs of sentence embeddings derived using the large language model.

7. A system having a memory, computer readable instructions, and one or more processors for executing the computer readable instructions, the computer readable instructions controlling the one or more processors to perform operations comprising:
   presenting a user interface to a user during a session, the user interface comprising:
      a search box; and
      a font category suggestion frame;
   receiving a search query input in the search box;
   obtaining a top N font categories for the search query, wherein obtaining the top N font categories comprises:
      generating a query embedding from the search query input using a compact model trained from a large language model using contrastive learning, wherein the contrastive learning comprises inputting domain-specific training data comprising sentences extracted from design templates to the large language model to generate, for each extracted sentence, a domain-specific sentence embedding; and
      determining a distance measure between the query embedding and at least one font tag embedding; and
   populating the font category suggestion frame with the top N font categories for the search query.

8. The system of claim 7, wherein the search query comprises a natural language text string comprising a font recommendation query.

9. The system of claim 7, wherein the computer readable instructions further control the one or more processors to populate the font category suggestion frame in the user interface responsive to receiving the search query.

10. The system of claim 7, wherein the computer readable instructions further control the one or more processors to receive, from the user, a selection of a suggested font category from among the top N font categories.

11. The system of claim 10, wherein, responsive to receiving the selection of the suggested font category, the computer readable instructions further control the one or more processors to provide one or more font recommendations for fonts labeled with a same font category as the suggested font category.

12. A system comprising:
- a compact model trained from a large language model using contrastive learning, wherein the contrastive learning comprises inputting domain-specific training data comprising sentences extracted from design templates to the large language model to generate, for each extracted sentence, a domain-specific sentence embedding;
- a data warehouse comprising the compact model and one or more font tag embeddings; and
- a memory having computer readable instructions and one or more processors for executing the computer readable instructions, the computer readable instructions controlling the one or more processors to perform operations comprising:
  - inputting a font category to the compact model to generate a font tag embedding;
  - storing the font tag embedding in the data warehouse;
  - receiving a search query from a user;
  - inputting the search query to the compact model to generate a query embedding;
  - determining a distance measure between the query embedding and the font tag embedding; and
  - responsive to the distance measure satisfying a predetermined threshold, providing the font category for the font tag embedding to the user.

13. The system of claim 12, wherein the computer readable instructions control the one or more processors to perform further operations comprising inputting a plurality of font categories to the compact model to generate a plurality of font tag embeddings.

14. The system of claim 13, wherein the computer readable instructions control the one or more processors to perform further operations comprising determining a distance measure between the query embedding and each of the plurality of font tag embeddings.

15. The system of claim 14, wherein the computer readable instructions control the one or more processors to perform further operations comprising providing a top N font categories for the font tag embeddings having a highest similarity to the query embedding.

16. The system of claim 12, wherein the compact model comprises a first model complexity comprising a first number of hidden layers and the large language model comprises a second model complexity comprising a second number of layers larger than the first number of hidden layers.

* * * * *